US008669938B2

(12) United States Patent
Richardson

(10) Patent No.: US 8,669,938 B2
(45) Date of Patent: *Mar. 11, 2014

(54) APPROACH FOR OFFSET MOTION-BASED CONTROL OF A COMPUTER

(75) Inventor: James D. Richardson, Corvallis, OR (US)

(73) Assignee: NaturalPoint, Inc., Corvallis, OR (US)

(*) Notice: Subject to any disclaimer, the term of this patent is extended or adjusted under 35 U.S.C. 154(b) by 1228 days.

This patent is subject to a terminal disclaimer.

(21) Appl. No.: 11/943,503

(22) Filed: Nov. 20, 2007

(65) Prior Publication Data

US 2009/0128482 A1 May 21, 2009

(51) Int. Cl.
*G06F 3/033* (2013.01)

(52) U.S. Cl.
USPC ........................................... 345/158; 463/30

(58) Field of Classification Search
USPC .............. 345/156, 7–9, 157–167; 702/94, 95; 463/30
See application file for complete search history.

(56) References Cited

U.S. PATENT DOCUMENTS

| | | | | |
|---|---|---|---|---|
| 4,682,159 A * | 7/1987 | Davison | ........................ | 345/158 |
| 5,367,614 A * | 11/1994 | Bisey | ............................ | 345/419 |
| 5,436,639 A * | 7/1995 | Arai et al. | ...................... | 345/156 |
| 5,771,307 A * | 6/1998 | Lu et al. | .......................... | 382/116 |
| 6,084,556 A * | 7/2000 | Zwern | ................................ | 345/8 |
| 6,396,497 B1 * | 5/2002 | Reichlen | ....................... | 345/427 |
| 6,853,935 B2 * | 2/2005 | Satoh et al. | ....................... | 702/94 |
| 7,233,872 B2 * | 6/2007 | Shibasaki et al. | ............... | 702/94 |
| 7,602,301 B1 * | 10/2009 | Stirling et al. | ............. | 340/573.1 |
| 7,774,075 B2 * | 8/2010 | Lin | .................................. | 700/17 |
| 2002/0084974 A1 * | 7/2002 | Ohshima et al. | .............. | 345/156 |
| 2002/0158827 A1 * | 10/2002 | Zimmerman | ................... | 345/88 |
| 2002/0175897 A1 * | 11/2002 | Pelosi | .......................... | 345/158 |
| 2004/0149036 A1 * | 8/2004 | Foxlin et al. | ..................... | 73/511 |
| 2005/0253871 A1 * | 11/2005 | Anabuki et al. | ............... | 345/633 |
| 2005/0264527 A1 * | 12/2005 | Lin | ................................ | 345/156 |
| 2006/0033713 A1 * | 2/2006 | Pryor | .......................... | 345/158 |
| 2006/0183546 A1 * | 8/2006 | Addington et al. | ............. | 463/37 |
| 2007/0211027 A1 * | 9/2007 | Ohta | ............................ | 345/158 |
| 2007/0222750 A1 * | 9/2007 | Ohta | ............................ | 345/158 |
| 2008/0001918 A1 * | 1/2008 | Hsu et al. | ....................... | 345/157 |
| 2008/0080789 A1 * | 4/2008 | Marks et al. | .................. | 382/296 |
| 2008/0117167 A1 * | 5/2008 | Aonuma et al. | .............. | 345/157 |
| 2008/0136916 A1 * | 6/2008 | Wolff | ............................ | 348/169 |
| 2008/0186255 A1 * | 8/2008 | Cohen et al. | ...................... | 345/8 |
| 2008/0297474 A1 * | 12/2008 | Blomqvist et al. | ............ | 345/158 |

(Continued)

OTHER PUBLICATIONS

Meers, Simon et al., "Simple, Robust and Accurate Head-Pose Tracking Using a Single Camera," *Faculty of Informatics*, University of Wollongong, 2006.

*Primary Examiner* — Amare Mengistu
*Assistant Examiner* — Vinh Lam
(74) *Attorney, Agent, or Firm* — Alleman Hall McCoy Russell & Tuttle LLP

(57) ABSTRACT

A system for controlling a computing device. The system includes, a plurality of sensed locations corresponding to a sensed object, a sensing apparatus to sense a position of the sensed locations relative to the sensing apparatus, and a motion control engine executable on a computing device, in response to the motion control engine receiving position data indicative of the position of the sensed locations from the sensing apparatus, the motion control engine to generate an adjusted position based on the position data, wherein the adjusted position is offset from the position of the sensed locations, and wherein the adjusted position is fixed relative to the position of the sensed locations.

20 Claims, 6 Drawing Sheets

(56) References Cited

U.S. PATENT DOCUMENTS

| | | | |
|---|---|---|---|
| 2009/0009469 A1* | 1/2009 | Hsu et al. | 345/158 |
| 2009/0102746 A1* | 4/2009 | Fisher et al. | 345/8 |
| 2010/0079374 A1* | 4/2010 | Cortenraad et al. | 345/158 |
| 2010/0141555 A1* | 6/2010 | Rorberg et al. | 345/8 |
| 2010/0141578 A1* | 6/2010 | Horiuchi et al. | 345/158 |
| 2010/0214214 A1* | 8/2010 | Corson et al. | 345/158 |

* cited by examiner

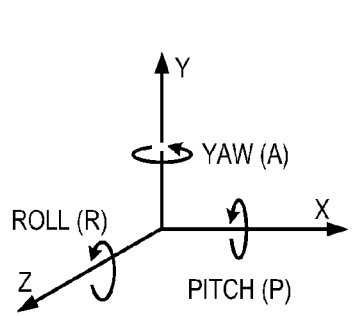
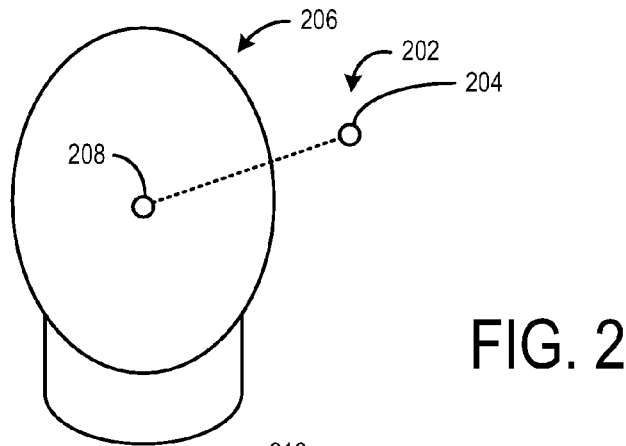
FIG. 2
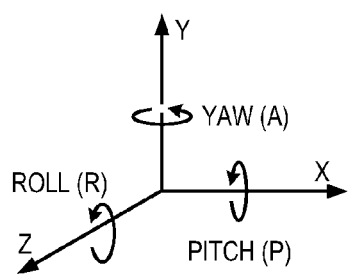
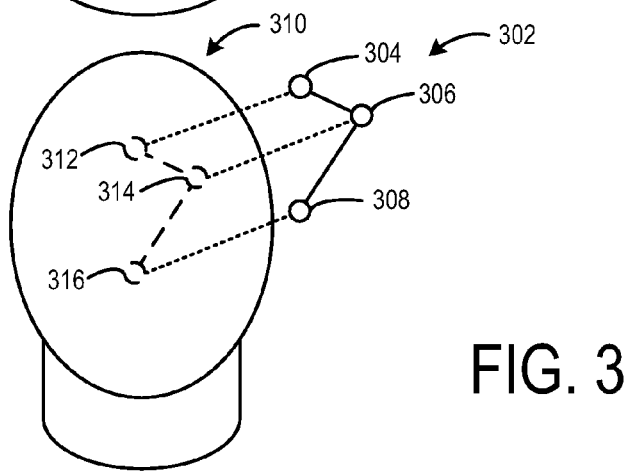
FIG. 3
| 6 DEGREES OF FREEDOM | X | Y | Z | PITCH (P) | ROLL (R) | YAW (A) |
|---|---|---|---|---|---|---|
| ACTUAL POSITION | P1 | P2 | P3 | P4 | P5 | P6 |
| OFFSET | O1 | O2 | O3 | O4 | O5 | O6 |
| ADJUSTED POSITION | P1 + O1 | P2 + O2 | P3 + O3 | P4 + O4 | P5 + O5 | P6 + O6 |
FIG. 4

APPROACH FOR OFFSET MOTION-BASED CONTROL OF A COMPUTER

TECHNICAL FIELD

The present description relates to systems and methods for using a movable object to control a computer.

BACKGROUND

Motion-based control systems may be used to control computers and more particularly, motion-based control systems may be desirable for use with video games. Specifically, the interactive nature of control based on motion of a movable object, such as for example, a user's head may make the video gaming experience more involved and engrossing because the simulation of real events may be made more accurate. For example, in a video game that may be controlled via motion, a user may move their head to different positions in order to control a view of a rendered scene in the video game. Since the view of the rendered scene is linked to the user's head movements the video game control may feel more intuitive and the authenticity of the simulation may be improved.

In one example configuration of a motion-based control system, a user may view a rendered scene on a display screen and may control aspects of the rendered scene (e.g. change a view of the rendered scene) by moving their head. The display screen may be fixed whereas the user's head may rotate and translate in various planes relative to the display screen. In such a configuration, a sensing apparatus or a sensed beacon may be attached to the user's head in some fashion and control of aspects of the rendered scene may be based on the position of the sensed beacon relative to the sensed apparatus.

However, there may be some drawbacks to controlling aspects of a rendered scene directly based on the actual position of the sensing beacon relative to the sensing apparatus. Namely, with regard to the above example, since the sensing beacon or the sensing apparatus may be positioned adjacent to the user's head and not at a substantially central position of the user's head, motion-based control of the rendered scene using the head of the user may be inaccurate or skewed since the sensing beacon or sensing apparatus may offset in a particular direction to a side of the users head. Accordingly, presentation of a rendered scene may be perceived as skewed, unnatural, and/or inaccurate by a user since the perspective and movement of the rendered scene may not be aligned with a user expected position

BRIEF DESCRIPTION OF THE DRAWINGS

FIG. 2 depicts an example of a sensed location representative of a sensed object that is offset from an actual position to an adjusted position.

FIG. 3 depicts an example of a plurality of sensed locations representative of a sensed object that are offset from an actual position to an adjusted position.

FIG. 4 graphically depicts one example of an actual position being offset in six degrees of freedom to an adjusted position.

DETAILED DESCRIPTION

The present description is directed to a system for controlling a computer (e.g., controlling computer hardware, firmware, a software application running on a computer, etc.) based on the real-world movements of an operator's body or other external object. The description is broadly applicable to a setting where positioning of an object is used for controlling a computer (e.g., computer game software), although the examples discussed herein are primarily directed to control based on movements of a user's head, as detected by a computer-based position sensing system. More particularly, many of the examples herein relate to using sensed head movements to control a virtual reality software program, and still more particularly, to control display of virtual reality scenes in a game or other software that provides "first person" and/or "third person" views of a computerized scene.

Furthermore, various approaches for creating an adjusted position for control of presentation of a rendered scene that is offset from a sensed location will be discussed herein below. By offsetting the control position away from a sensed location to a desired position of a sensed object, accuracy of motion based control as perceived by a user may be improved.

Figure 1:
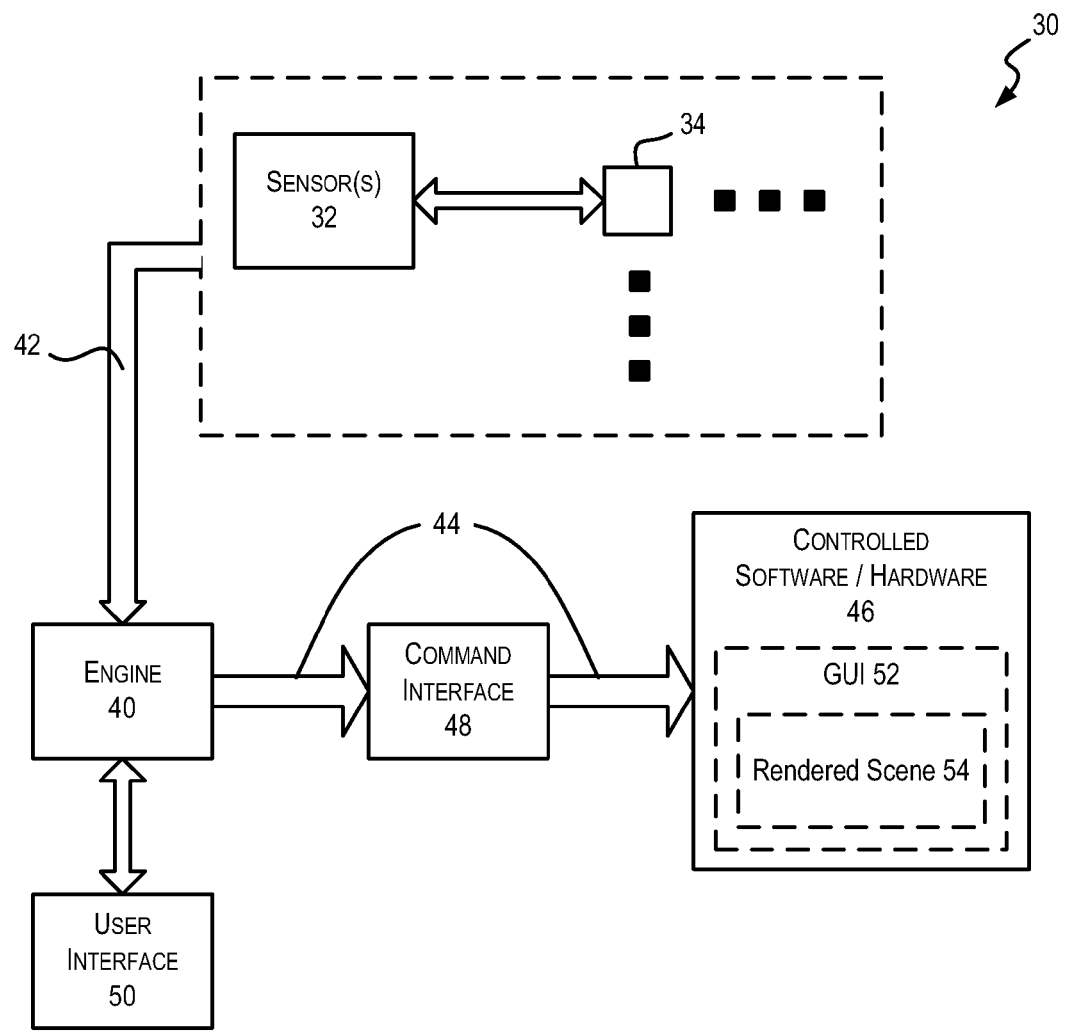
FIG. 1 depicts a schematic block diagram depicting a system for controlling a computer based on position and/or movement of a sensed object.

FIG. 1 schematically depicts a motion-based control system 30 according to the present description. A sensing apparatus, such as sensor or sensors 32, is responsive to, and configured to detect, movements of one or more sensed locations 34, relative to a reference location or locations. According to one example, the sensing apparatus is disposed or positioned in a fixed location (e.g., a camera or other optical sensing apparatus mounted to a display monitor of a desktop computer). In this example, the sensing apparatus may be configured to sense the position of one or more sensed locations on a sensed object (e.g., features on a user's body, such as reflectors positioned at desired locations on the user's head).

According to another embodiment, the sensing apparatus may be moveable and the sensed locations may be fixed. For example, in the setting discussed above, the camera may be secured to the user's head, with the camera being used to sense the relative position of the camera and a fixed sensed location, such as a reflector secured to a desktop computer monitor. Furthermore, multiple sensors and sensed locations may be employed, on the moving object and/or at the reference location(s). In one particular example, a plurality of sensed locations may correspond to multiple parts of a body of a user and the different body parts may act as sensed locations to control different aspects of presentation of a rendered scene or other aspect of control of a computing device. Further, in another example multiple sensed locations may correspond to an intermediary object controllable by the user. Further still, the sensed locations may correspond to both the body of the user and the intermediary object.

It will be appreciated that the position of the sensed locations may be relative to a reference position. For example, the reference position may be proximate to the sensing apparatus and thus the position of the sensed locations may be relative to the sensing apparatus. Further, it will be appreciated that other desired reference positions may be used to define a position of the sensed locations.

In the above example embodiments, position sensing may be used to effect control over rendered scenes or other images generated by a computing device on a display monitor positioned away from the user, such as a conventional desktop computer monitor or laptop computer display.

One or more sensed locations may correspond to a sensed object which may be used to affect control of a computing device, and more particularly, may be used to affect control of presentation of a rendered scene, such as a virtual reality game, for example. In some cases, the sensed locations may correspond to a sensed object by being secured or affixed to a sensed object. In one particular example, the sensed locations maybe fixed on a headset worn by a user and the sensed object may be the head of the user. In some cases, the sensed locations may correspond to a sensed object by having a position or orientation relative to the sensed object. In one particular example, the sensed locations may be fixed or integrated with a control device held in a hand of a user and the sensed object may be the hand of the user. Further, it will be appreciated that the sensed locations may correspond to a sensed object in other suitable manners to affect control of a computer.

Continuing with FIG. 1, sensing apparatus 32 typically is operatively coupled with engine 40, which receives and acts upon position signals or positional data 42 received from sensing apparatus 32. Engine 40 receives these signals and, in turn, generates control commands (or signals) 44 which are applied to control software/hardware 46 (e.g., a flight simulation program), which may also be referred to as the "object" or "objective" of control. Engine 40 may be configured to generate an adjusted position based on the positional data that simulates a position of the sensed object in order to improve control accuracy of the object of control. In particular, engine 40 may modify positional data received from the sensing apparatus to create an offset position from which control of a rendered scene or other aspect of a computing device may be based. Further, the adjusted or offset position may be fixed relative to the actual position of the sensed locations.

In some embodiments, software/hardware 46 may include a graphical user interface (GUI) 52 to facilitate setup of an offset position to control presentation of rendered scene 54. The offset setup GUI will be discussed in further detail below. Further, it will be appreciated that in some embodiments, engine 40 may automatically offset the actual position of the sensed location to an adjusted position without user interaction. In some cases, engine 40 may be configured to offset the actual position of the sensed locations to a predetermined adjusted position.

Various additional features and functionality may be provided by user interface 50. For example, user interface 50 may include one or more user input devices such as a mouse or keyboard. It should be appreciated that the above described motion-based control system hardware and software may be implemented via various computing systems including but not limited to personal computers, laptops, gaming consoles, simulators etc. Furthermore, the engine, controlled software and/or command interface may be executable code that is stored in a storage medium of the computing system. In some embodiments, the engine may be executable by a processor included in the sensing apparatus. In other embodiments, the engine may be executable and or stored on other hardware that may be included in a different computing device of the system.

The object of control which may be controlled according to movements of the sensed locations associated with one or more sensed object(s) (e.g. a user's head) may take a wide variety of forms. As discussed above, the object of control may be a first person virtual reality program, in which position sensing is used to control presentation of first person virtual reality scenes to the user (e.g., on a display). Additionally, or alternatively, rendering of other scenes (i.e., other than first person scenes) may be controlled in response to positioning of the sensed locations or as desired an adjusted position offset to correspond with the sensed object. It will be appreciated that a wide variety of other hardware and/or software control may be based on position sensing, other than control of a view of a rendered scene.

Continuing with FIG. 1, in some embodiments, the various depicted components may be provided by different vendors. Accordingly, in order to efficiently facilitate interoperability, it may be desirable to employ components such as command interface 48, to serve as translators or intermediaries between various components. Assume, for example, that the object of control is a video game that has been available for a period of time, with established commands for controlling panning/movement of scenes and other aspects of the program. Assume further that it was originally intended that these control commands be received from a keyboard and mouse of a desktop computer. To employ the motion control described herein with such a system, it may be desirable to develop an intermediary, such as command interface 48, rather than performing a significant modification to engine software 40. The intermediary would function to translate the output of engine software 40 into commands that could be recognized and used by the video game. In many embodiments, the design of such an intermediary would be less complex than the design of engine 40, allowing the motion control system to be more readily tailored to a wide range of existing games/programs. In one example, command interface 48 may be included in a software development kit (SDK) that may be distributed to developers so that motion control setting may be easily included in software that is being developed.

FIGS. 2-3 show different example configurations of one or sensed locations that correspond to a sensed object to control presentation of a rendered scene or other computing operations. In each of the examples, the sensed locations maybe offset to an adjusted position that is aligned with the sensed object in order to improve control accuracy of the rendered scene from the perspective of the sensed object as perceive by a user. FIGS. 2-3 show a relative frame of reference that may be used to describe translational and rotational movement of the sensed location(s) and/or the sensed object. The frame of reference for the sensed object may be determined based on a position of sensed locations 34 relative to the sensing apparatus or another predetermined reference position. In one particular example, sensed locations 34 may be in a fixed configuration positioned in proximity to the head of a user. The location of the sensed locations relative to a fixed location may be determined using a sensing apparatus, such as for example, an infrared camera. Assuming that the infrared camera is positioned in proximity to a computer display, assume the Z axis of the frame of reference represents translation of the user's head linearly toward or away from the computer display point of reference. The X axis would then represent horizontal movement of the head relative to the reference, and the Y axis would correspond to vertical movement. Rotation of the head about the X axis is referred to as "pitch" or P rotation; rotation about the Y axis is referred to as "yaw" or A rotation; and rotation about the Z axis is referred to as "roll" or R rotation. Accordingly, the sensed object may translate and/or change orientation within the frame of reference based on the reference location.

It should be appreciated that the use of an infrared camera is exemplary only and that other types of cameras and sensing may be employed. Indeed, for some applications, non-optical motion/position sensing may be employed in addition to or instead of cameras or other optical methods. For example, positional data indicative of an actual position of a sensed location may be generated from one or more accelerometers. Further, the positional data generated from the accelerometers may be relative to a world coordinates system and the positional data may be adapted to a relative coordinate system and corresponding plane of reference.

Referring now to FIG. 2, an example of a sensed location corresponding to a sensed object to control presentation of a rendered scene is shown. Sensed location 202 may be located at an actual position 204 that is proximate to sensed object 206. Actual position 204 may be a position relative to a reference position and may have a frame of reference that is relative to the reference position. As discussed above, sensed object 206 may be any suitable object and the motion of sensed object 206 may be used to control a computing device. In one example, the sensed location may be an infrared light emitting diode (LED), a reflective surface, or other sensing beacon and the sensed object may be the head of a user. The infrared LED, etc. may be placed proximate to the head of a user to track movement of the head by any suitable coupling device such as a headset, helmet, hat, clip, etc. However, controlling presentation of a rendered scene directly based on the actual position of the sensed location may cause the rendered scene to appear skewed since, in this example, the actual position of the sensed location may be located upward and rightward of the sensed object as viewed from the position facing the sensed object. Accordingly, the actual position 204 of the sensed location 202 may be offset to an adjusted position 208. In this example, the adjusted position 208 may be located at a central position of sensed object 206, or in the case that the sensed object is a head the adjusted position may be aligned with eyes of the head. In this way, the adjusted position from which presentation of a rendered scene may be controlled may be aligned with a perspective of a user. Aligning the adjusted position with the eyes of a user may be particularly applicable to a rendered scene presented in a first person perspective such as during a first person virtual reality game.

It will be appreciated that the adjusted position may be offset from the actual position of the sensed location to any suitable position corresponding to the sensed object in order to improve motion based control and presentation accuracy of a rendered scene. Further, the offset may include translational and/or rotational shifting of the actual position in order to create the adjusted position.

Turning now to FIG. 3 an example of a plurality of sensed locations corresponding to a sensed object to control presentation of a rendered scene is shown. Sensed locations 302 may be located at actual positions 304, 306, and 308 that are proximate to sensed object 310. In particular, sensed locations 302 may include three sensed locations arranged in a fixed array with each of the three sensed locations being fixed relative to the other sensed locations. In some cases, a fixed array of three or more sensed locations may be used to determine an orientation of a sensed object with six degrees of freedom of movement corresponding to six axes of movement (X, Y, Z, P, R, Y). Since the three sensed locations may be fixed relative to each other, the position of the sensed locations relative to a reference position may be used to designate a frame of reference to the sensed object and determine translation and rotation of the sensed object. In this way, movement of a sensed object in three-dimensional space may be evaluated for up to six degrees of freedom and control of the rendered scene may be correspondingly adjusted based on six degrees of freedom.

Similar to the configuration of FIG. 2, the actual position 304, 306, 308 of the plurality of sensed locations 302 may be offset from the a desired position corresponding to the sensed object 310 due to the manner in which the sensed locations are coupled to the sensed object. For example, a user may wear a headset having a fixed array of light emitting diodes and the array may be raised or located in another position since the headset may rest on top of the user's head. Accordingly, the actual position 304, 306, 308 of the plurality of sensed locations 302 may be offset to an adjusted position 312, 314, 316. In this example, the adjusted position of the plurality of sensed location may be located substantially at a central position of sensed object, or in the case that the sensed object is a head the adjusted position may be aligned with eyes of the head. Note that six degrees of freedom may be tracked for the plurality of sensed locations and correspondingly the adjusted position of the plurality of sensed location may include a separate offset value for each of the six degrees of freedom. Accordingly, the adjusted position 312, 314, 316 may include translations in one or more of the X, Y, X axes and rotations in one or more of the P, R, A axes in order to create an offset substantially at a center position of the sensed object. In this way, the adjusted position from which presentation of a rendered scene may be controlled may be aligned with a perspective of a user.

In some embodiments, a single position defined by six degrees of freedom may be derived from the actual position of a plurality of sensed locations. By creating a single position with six degrees of freedom motion control processing may be simplified. For example, the three sensed locations of the fixed array shown in FIG. 3 may be averaged to generate a single location like that shown in FIG. 2. Further, the single location may include six points or values corresponding to the six degrees of freedom that may be determined from the orientation of three the sensed location relative to a fixed location. Note that other calculations and/or processing may be performed to derive a single position for a plurality sensed locations.

FIG. 4 diagrammatically shows an example of an actual position with six degrees of freedom that may be modified with a separate offset each of the six degrees of freedom to create an adjusted position that has six degrees of freedom. Diagram 400 includes an actual position created from one or more sensed locations. The actual position may include six degrees of freedom of movement. In particular, the six degrees may correspond to a different axis of movement including translational axes X, Y, Z and rotational axes pitch (P), roll (R), yaw (A). In one example, the actual position of the sensed locations may be represented as one or more matrices of values corresponding to the six degrees of freedom and having points P1, P2, P3, P4, P5, and P6. In order to shift the actual position to a desired adjusted position, a separate offset may be generated for each point of the six degrees of freedom. In particular, offset O1 may correspond to the X axis; offset O2 may correspond to the Y axis; offset O3 may correspond to the Z axis; offset O4 may correspond to the P axis; offset O5 may correspond to the R axis; and offset O6 may correspond to the A axis. Thus, by shifting the actual position by the offset in each of the six degrees of freedom, an adjusted position may be generated that is accurately shifted in all axes of movement.

It will be appreciated that each of the offsets may differ based on their position relative to a predetermined reference position and/or the relative frame of reference. In some cases if the offsets did not differ based on the relative frame of reference, but rather the same offset value was applied to all degrees of freedom of the actual location, the adjusted position may be shifted away from a desired position resulting in skewing of the perspective of the rendered scene. Skewing of the presentation of the rendered scene due to shifting based on a single offset value may most be most apparent in a motion based control system where rotational and/or translational movement of the sensed object is scaled. However, by creating a separate offset for each the six degrees of freedom where the offsets differ based on a frame of reference that is relative to a reference position, an accurate perspective of a rendered scene may be presented even during scaled rotational and translational movement of the perspective.

Figure 5A:
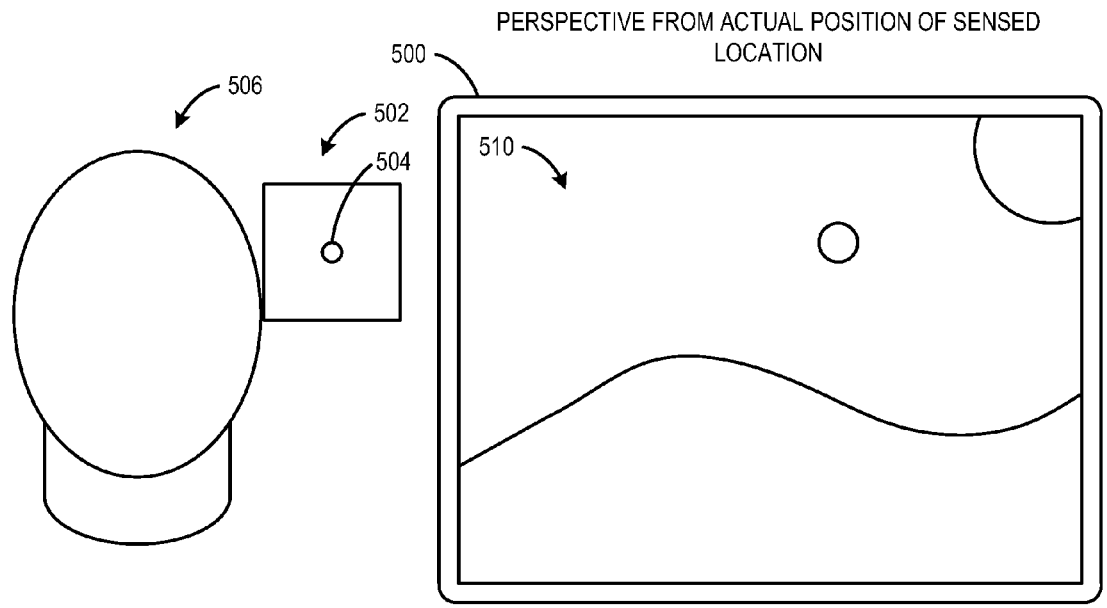
FIGS. 5A-5B depict an examples of a perspective of a rendered scene that is modified based on an actual position of a sensed location being offset to an adjusted position.
Figure 5B:
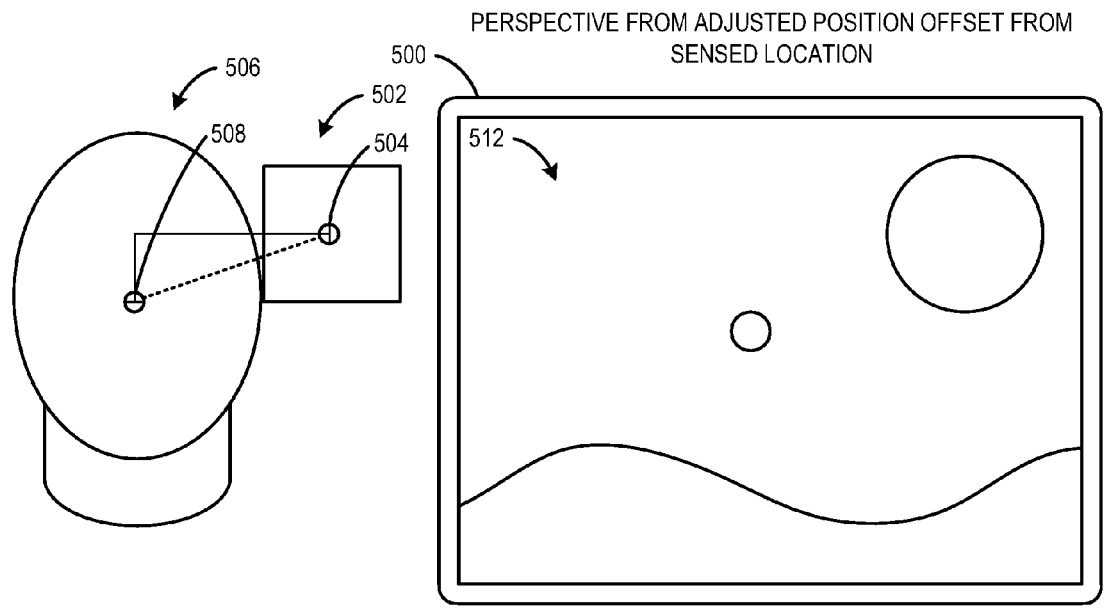

FIGS. 5A-5B each show a different perspective of a rendered scene presented based on an actual position of a sensed location and an adjusted position that is offset from the actual location of the sensed location to a substantially center position of the corresponding sensed object. The perspective of the rendered scene presented directly based on the actual position of the sensed location may be skewed from an expected perspective that may be aligned with a view of a user. On the other hand, the perspective of the rendered scene presented based on the adjusted position that is offset to a center position of a sensed object may be aligned with the expected perspective the viewed by a user.

FIG. 5A shows an example of a rendered scene 500 that may be presented from a perspective 510 that is based on an actual position 504 of a sensed location 502. Sensed location 502 may be placed proximate to a sensed object 506 and the movement of sensed object 506 may dictate the movement of sensed location 502. Due to the logistics of coupling the sensed location to the sensed object, the sensed location may be placed at a position away from a central position of the sensed object. For example, the sensed object may be a user's head and it may be difficult to place a sensed location at the center of a user's head without impeding on the user's vision or comfort. Thus, the sensed location may be coupled to a side of a user's head via a coupling device, such as for example, a headset. Since the user may control presentation of the rendered scene based on movements of the user's head (sensed object), the user may expect the perspective of the rendered scene to align with the head of the user. However, in the illustrated example, the sensed location may be positioned upward and rightward of the user's head as viewed from a perspective of the user. In this example, since the rendered scene is presented directly based on the actual position of the sensed location, perspective 510 may be skewed, and more particularly, translated downward and leftward from the user expected perspective. In particular, the perspective of the rendered scene may be skewed such that the landscape of the rendered scene may be raised and the sun may be shifted upward and rightward such that it is partially removed from the rendered scene. The skewing of the rendered scene may be perceived by the user as unnatural and inaccurate In order to correct skewing of the perspective of the rendered scene the actual position of the sensed location from which control of the rendered scene is based may be offset to an adjusted position located at a substantially central position of the sensed object.

FIG. 5B shows an example of a rendered scene 500 that may be presented from a perspective 512 that is based on an adjusted position 508 positioned central to sensed object 506. Adjusted position 508 may be offset from actual position 504. In the example where the sensed object is a head of a user, the adjusted position may be located at a position of the eyes of the user. In particular, perspective 512 may include landscape that may be lower and a sun that may be positioned centrally as compared to perspective 510. By offsetting the position from which presentation of the rendered scene is controlled to be aligned with the eyes of a user, the perspective of the rendered scene may be positioned at a position that may be expected. In this way, presentation of a rendered scene may be improved since the perspective may be perceived by a user as more natural and accurate.

The rendered scene shown in FIGS. 5A-5B only shows translational shifting of the rendered scene based on the offset of the actual position of the sensed location to an adjusted position of the sensed location. However, it will be appreciated that an offset may include translational and/or rotational shifting to generate an adjusted position from an actual position. In one example, the offset may include six offset values that correspond to each of the six degrees of freedom which may be applied to the actual position to generate the adjusted position.

Figure 6:
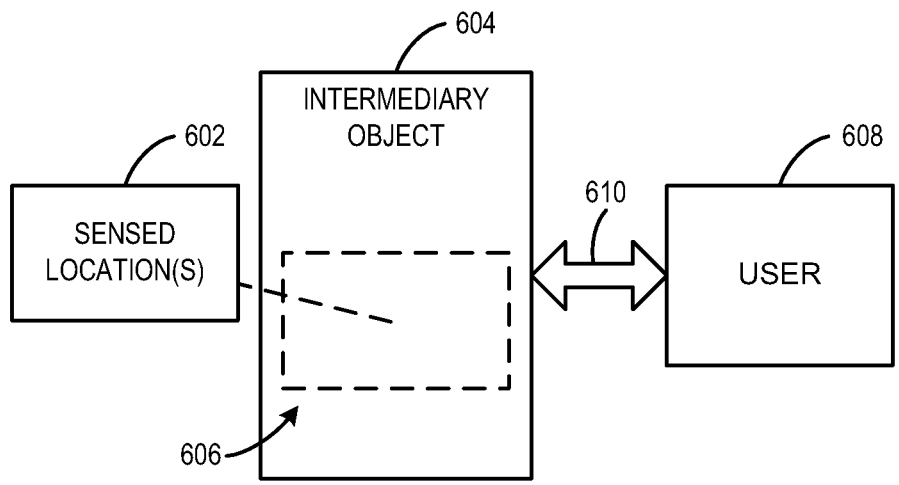
FIG. 6 depicts a schematic block diagram of one or more sensed location interacting with an intermediary object.

Turning now to FIG. 6, in some embodiments, one or more sensed locations 602 may be configured to be selectively coupled with an intermediary object 604 so that the intermediary object may be a sensed object to control output of a computing device. In particular, user 608 may interact with intermediary object 604 at 610 and since sensed locations 602 may be coupled to intermediary object 604 at 606, the motion of intermediary object 604 may control output of a computing device, such as for example, controlling presentation of a rendered scene. It will be appreciated that sensed locations 602 may be coupled to the intermediary object 604 in any suitable manner at 606. For example, the sensed locations may include a fixed infrared array that may be enclosed, snap fit, strapped, screwed, etc. to an intermediary object such that the sensed locations may represent the motion of the intermediary object. In some examples, an intermediary object may be used as a prop to aid a user in simulating different actions in a virtual reality environment. For example, an intermediary object may simulate various types of sporting equipment, such as for example, a baseball bat, tennis racket, steering wheel, joystick, etc.

In some cases, the position at which the sensed locations may be coupled to the intermediary object may not accurately represent the position of the intermediary object. Thus, in order to improve accuracy of control, the actual position of the sensed locations may be offset to an adjusted position that accurately represents the position of the intermediary object. The adjusted position and/or the offset may be generated in any suitable manner as discussed above and herein below.

Furthermore, in some cases, an adjusted position and/or offset may be modified according to predefined positional and/or motion based characteristics of an intermediary object or characteristics of interaction between the intermediary object and the user. In one example, the motion control engine may be configured to offset the adjusted position of one or more sensed location by a predetermined set of values based on at least one of an orientation of the sensed locations relative to the intermediary object and an orientation of the intermediary object to the user.

Figure 7:
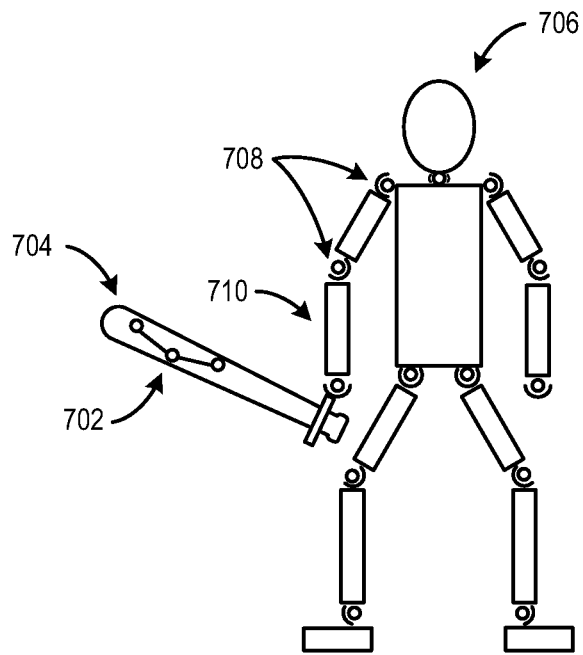
FIG. 7 depicts an example of an intermediary object interacting with a virtual user.

FIG. 7 shows an example of how a plurality of sensed locations coupled to an intermediary object may interact with a user based on predefined positional and motion based characteristics. In the illustrated embodiment, a fixed array of sensed locations 702 may be selectively coupled to an intermediary object 704. In this example, the intermediary object may simulate a baseball bat for use with a virtual reality baseball simulation. The fixed array may have a predefined position relative to the bat that may be taken into account to generate an offset or adjusted position. For example, the baseball bat may have defined dimensions and the adjusted position of the sensed locations may include an offset based of the defined dimensions.

Furthermore, a virtual user 706 may be in operative communication with intermediary object 704. Virtual user 706 may include a plurality of rigid bodies 710 that may be connected via joints 708. Each rigid body may have a defined range of motion relative to another rigid body based on the type of joint. In one example, the predefined range of motion of the rigid bodies may simulate approximately the range of motion of appendages of a person. The known ranges of motion of the rigid bodies may be applied to the position of the intermediary object relative to a particular rigid body in order to define movement and offset or adjusted position limitations.

In some embodiments, multiple sensed objects may correspond to different parts of the virtual user. Each of the sensed objects may have corresponding sensed locations which may be offset to an adjusted position to accurately define the position of the sensed objects. For example, a virtual user may include sensed locations corresponding to and placed proximate to each joint of the user. Each actual position of the sensed locations may be offset to an adjusted position that may be at a substantially central location of each joint. In this way, the accuracy of motion-based control may be improved even for a plurality of sensed objects.

Further, in some embodiments, multiple sensed objects may correspond to virtual user and an intermediary object. In such a configuration, an offset may be generated for the intermediary object and offsets for one or more other sensed objects of the virtual user may be generated based on the offset of the intermediary object and know positions or motions of the intermediary object relative to the virtual user. In one example, inverse kinematics may be used to iteratively derive offsets for one or more sensed objects of the virtual user based on the offset and position of the intermediary device. Likewise, inverse kinematics may be used to generate one or more offsets of an intermediary device based on the offset and/or position of a sensed object of a virtual user.

Although FIG. 7 shows the virtual user in two dimensions and having rotation in two dimensions, it will be appreciated that the joints of the virtual user may have rotation in up to six degrees of freedom. Moreover, each joint may have a different range of motion in each degree of freedom which may be considered when generating an offset or adjusted position.

Figure 8:
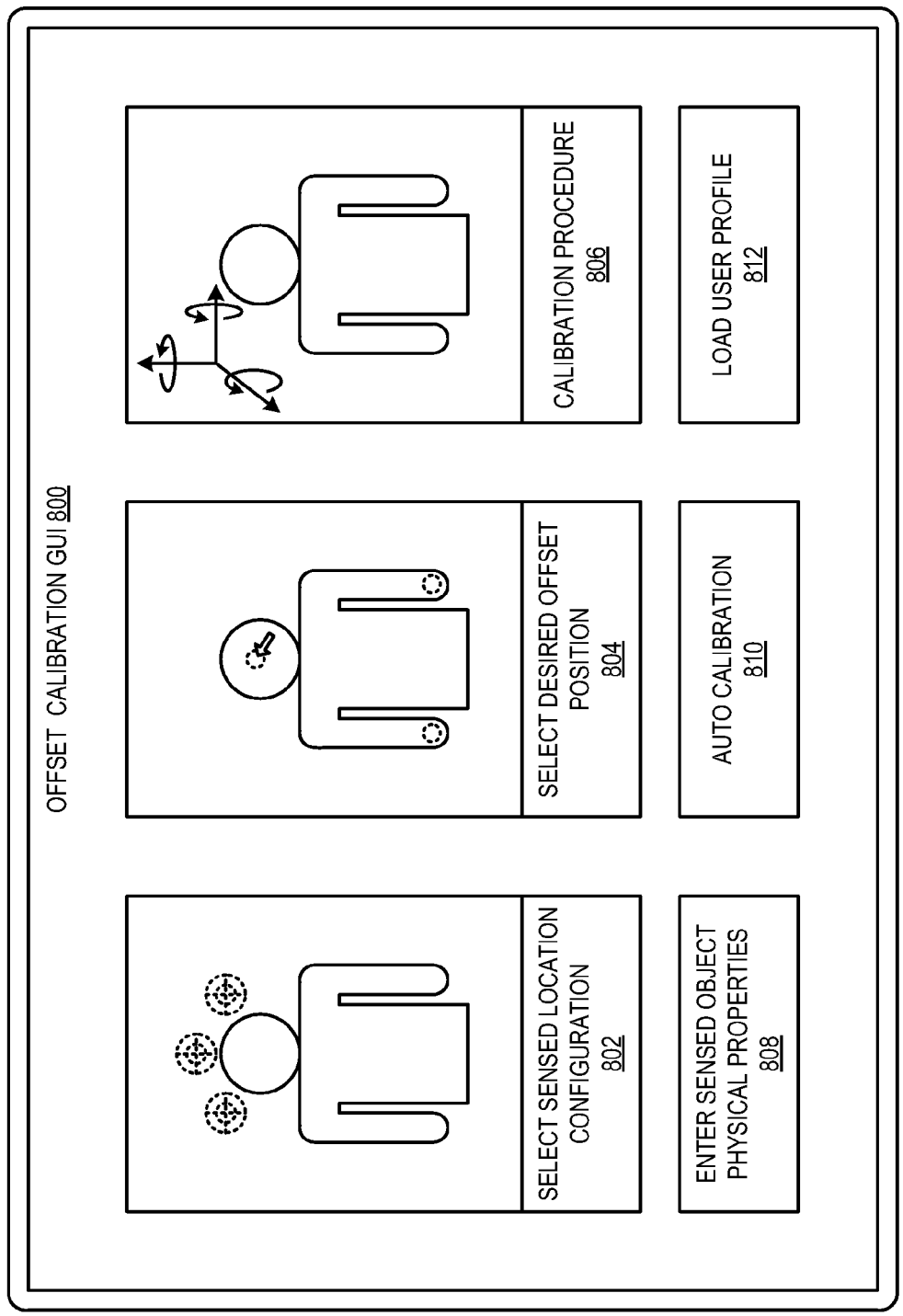
FIG. 8 depicts an example of a offset calibration graphical user interface.

FIG. 8 shows an example graphical user interface that may be configured to facilitate setup of an offset position to control output of a computing device. Offset calibration GUI 800 may be generated by a computing device and presented on a display of motion-based control system 30 shown in FIG. 1. Offset calibration GUI 800 may include one or more user selectable modules for calibrating an adjusted position that is offset from an actual position of one or more sensed locations. Some modules may initiate various different calibration procedures to define an adjusted position. Some modules may enable a user to select a calibrated offset that is predefined based on a desired adjusted position. The GUI calibrated offset and resulting adjusted position may be used to control presentation of a rendered scene in a manner that corrects skewing of a perspective in any suitable manner as described above.

Offset calibration GUI 800 may include a module to enable a user to select a sensed location configuration at 802. The module may include a plurality of predefined sensed location configurations and associated offsets from which a user may choose. For example, predefined sensed location configurations selectable in module 802 may include locations such as right side of head, left side of head, top of head, or other suitable appendage of a user, etc. Further, predefined sensed location configurations selectable in module 802 may include a predetermined number of sensed locations such as two, three, etc. Further still, predefined sensed location configurations selectable in module 802 may include types of sensed locations such as infrared LEDs, reflectors, headset, hat, fixed array, etc. In response to user selection of one of the predefined sensed location configurations, module 802 may apply the predefined offsets to the actual position of the sensed location to create an adjusted location as desired by the user.

In one particular example, a plurality of different manufactures may produce different headsets and each headset may include a different configuration of sensed locations with a different offset based on the configuration of the sensed locations. In this example, module may include a list of headsets and upon user selection or other indication of the type of headset, the predefined offset may be applied to shift the actual position to the adjusted position.

In some embodiments, the predefined sensed location configurations may be presented to a user pictorially. In some embodiments, the predefined sensed location configurations may be presented to a user via a drop down or other menu. It will be appreciated that the above predefined configuration types are exemplary and two or more of the configuration types may be combined to select a predefined offset or adjusted position. Further, it will be appreciated that other characteristics of predetermined sensed location configurations may be used to create a predefined offset or adjusted position. For example, module 802 may include a list of intermediary objects which may be coupled to the sensed object and the predefined offsets and adjusted position and/or predefined movement limitation may be applied based on the intermediary objects.

Offset calibration GUI 800 may include a module to enable a user to select a desired offset or adjusted position at 804. In one example, the module may include a diagram of a body and the user may point and click a location on or adjacent to the body to designate an offset or adjusted position from which a perspective of a rendered scene may be controlled. Upon selection of a desired position, engine software may determine offset values that may be applied to the actual position of one or more sensed locations in order to offset the actual position of the sensed location to the desired adjusted position. By enabling a user to select a desired position to control a perspective of a rendered scene, software and, more particularly, gaming may be easily customized for various configurations as desired by a user.

It will be appreciated that module 804 may be configured to enable a user to select multiple offsets or adjusted positions based on a number of sensed location and/or sensed objects to control presentation either a first person perspective or a third person perspective of a rendered scene or to control other computing operations. In one example, a user may select an offset or adjusted position for one or more sensed locations corresponding to the user's head and may select a second offset or adjusted position for one or more sensed locations corresponding to an intermediary object that may be held in a hand of a user. Further, in some embodiments, additional adjusted positions of sensed objects represented by additional sensed locations of a user may be determined relative to a selected offset or adjusted position by applying inverse kinematics. For example, a user selected adjusted position may correspond to a hand of a user and inverse kinematics may be used to determine how the user's arm or other body part is positioned relative to the designated adjusted position and any actual location of sensed locations corresponding to the arm or other body part may be adjusted based on the selected adjusted position. In this way, a plurality of sensed objects corresponding to a user may be accurately represented from selection of a single adjusted position corresponding to a single sensed object.

Offset calibration GUI 800 may include a module to enable a user to perform a calibration procedure in order to determine an offset or adjusted position of one or more sensed locations corresponding to a sensed object at 806. In one example, module 806 may present instructions to the user to perform various movements in order to detect and record movement patterns of the sensed object. The instructions may command the user to exercise the axes of movement of the sensed object in order to create data points corresponding to one or more sensed location. In particular, the instructions may command the user to move the sensed object to the limits of a range of motion in each of the translation and rotational axes in order to create data points. Based on the data points generated by exercising the axes of movement of the sensed object, engine software may be configured to determine a range of motion of the sensed object and may iteratively define a frame of reference of the sensed locations from which an offset may be created. Further, engine software may be configured to adjust an offset or adjusted position based on additional data points collected over time based on movements of the sensed object. In this way, an offset or adjusted position may be learned and/or updated over time to improve accuracy off the offset based on user movement tendencies.

In some embodiments, the calibration procedure and/or engine software may take into account known body kinematics and movement limitation to define an offset that corresponds to a sensed object which may be a part of a user's body.

Offset calibration GUI 800 may include a module to enable a user to enter physical properties of a sensed object that may be used to define an offset or adjusted position at 808. In one example, a general physical property may be entered such as for example identifying a body part that may be designated as the sensed object and the offset or adjusted position may be generated based on the designation. As another example, physical properties may be entered may have a finer granularity such as entering specific dimensions or movement limitations of various parts of a user's body or other intermediary object that may be designated as the sensed object and the offset or adjusted position may be generated based on the dimensions and/or limitations. In one particular example, the physical properties may define kinematic rules that may be applied to create the offset or adjusted position.

Offset calibration GUI 800 may include a module to enable a user to automatically calibrate an offset or adjusted position at 810. Automatic calibration may include free movement of a sensed object from which a cluster of data points may be generated based on the sensed locations of the sensed object. The data points may be processed to determine axes of movement of the sensed object and/or a relative frame of reference of the sensed object from which an offset or adjusted position may be created. Module 810 may differ from module 806 in that the calibration procedure may provide specific movement instructions to the user to determine an offset while module 810 may determine an offset only based on the collected data points.

Offset calibration GUI 800 may include a module to enable a user to load a user profile at 812. A user profile may include a predefined offset or adjusted position that may be generated according to any of the above described modules. A user may create and store one or more profiles based on use of various sensed objects or desired offset locations. For example, a user may have a first profile that includes an offset corresponding to the user's head for use with "fish tank" type first person gaming such as a flight simulator. The user may have a second profile that includes an offset corresponding to the user's hand and/or an intermediary object for use with a sports based game such as baseball or bowling simulation.

In some embodiments, an offset or adjusted position of a user profile may be dynamically modified as the offset or adjusted position is used to control software. In other words, the offset or adjusted position may be adaptively learned as user tendencies change and the updated offset or adjusted position may be saved in the user profile. Further, an offset or adjusted position may be adaptively learned in view of the specific software application or game being played by the user. Thus, if a user's movement tendencies or sensed locations change based on different games the offset or adjusted position may be adjusted accordingly. In this way, motion-based control accuracy may be maintained or improved throughout varied interaction with different games and other computer software.

Note that profiles may be created, stored, and/or loaded for a plurality of different users and each user may have a unique profile or set of profiles. In some embodiments, the offset profile may be a subsection of a user profile that includes other personal or statistical information associated with a user It will be appreciated that in some embodiments of the offset calibration GUI one or more of the above described modules may be omitted. In some embodiments, the offset calibration GUI may include only one type of calibration procedure or module for calibrating an offset or adjusted position.

In some embodiments, the offset calibration interface may not be presentable on a display or may not include graphic. In some embodiments, the offset calibration user interface may include a user input device configured to send user input to one or more components of the motion-based control system. For example, a user may provide user input to the offset calibration interface via a user device and the user input may be sent to the motion control engine to perform offset calibration.

Figure 9:
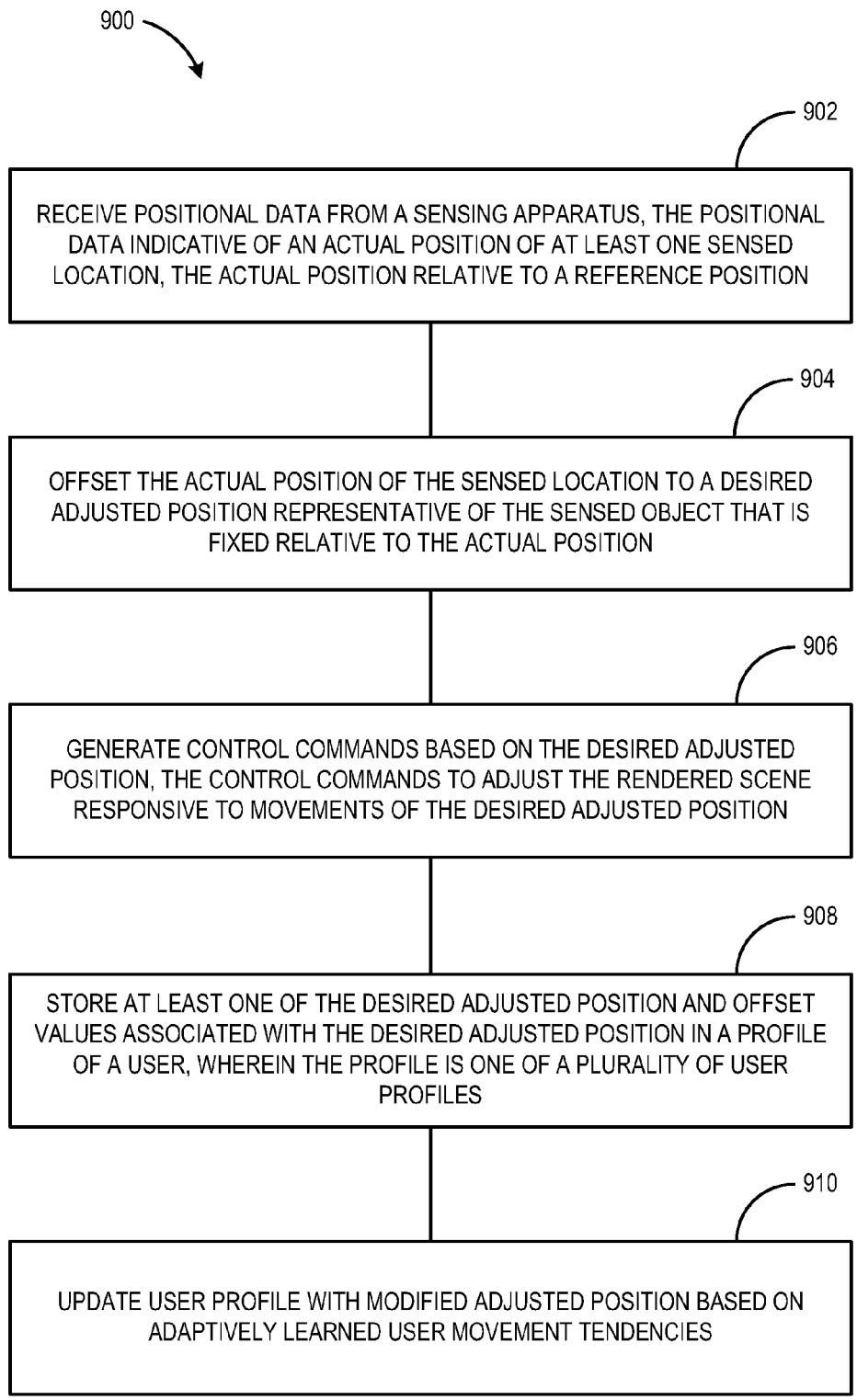
FIG. 9 depicts an example method for generating an adjusted position that is offset from an actual position of a sensed location.

Now turning to FIG. 9, an example method to control a rendered scene presentable on a display of a computing device utilizing a sensed object is shown. As discussed above, a sensed object may include, for example, a part of a user's body such as the user's head or an intermediary object that the user may control. Further, the sensed object may control presentation of an entire perspective of a rendered scene, such as for example, a first person view or may control presentation of a aspect of a rendered scene, such as for example, a the movement of a baseball bat controllable by a virtual player. The method may include at 902, receiving positional data from a sensing apparatus. The positional data may be indicative of an actual position of at least one sensed location. The actual position of the sensed location may be relative to a reference position. As one example, the actual position may be relative to the sensing apparatus. In some cases, the positional data may be indicative of a plurality of sensed locations and a single location having six degrees of freedom of movement may be derived from the positional data.

At 904, method 900 may include offsetting the actual position of the sensed location to a desired adjusted position representative of the sensed object. As discussed above with reference to FIG. 8, a desired adjusted position may be selected in a variety of ways. In one example, a desired adjusted position may be located at a substantially central location of a head of a user proximate to the user's eyes which may create a perspective aligned with the vision of the user. As another example, the desired adjusted position may be located at a substantially central position of a joint of a user's body.

Furthermore, offsetting the actual position of the sensed location to a desired adjusted position may account for the six degrees of freed of movement of the sensed object. In one example, a separate offset may be created for each degree of freedom of movement of the actual position of the sensed location. Thus, the adjusted position may be fixed relative to the actual position throughout an entire range of motion of the sensed locations.

At 906, method 900 may include generating control command based on the desired adjusted position. The control commands may be configured to adjust the rendered scene responsive to movement of the desired adjusted position. In one example, control commands may be generated by engine software sent to a controlled software application such as a virtual reality video game. Although, it will be appreciated that control commands may be generated by software other than engine software such as in a video game software or software of a sensing apparatus, for example.

At 908, method 900 may include storing at least one of the desired adjusted position and offset values associated with the desired adjusted position in a profile of a user. The user profile may be one of a plurality of user profiles.

At 910, method 900 may include updating a user profile with a modified adjusted position. The modified adjusted position may be adaptively learned based on user movement tendencies. As discussed above, an adjusted position may be modified in a user profile for a particular type of software such as for a particular game, on the other hand, the adjusted position may be modified for multiple or all rendered scenes or other control applications. In some embodiments, sense may be rendered based on learned offset or adjusted positional feedback to improve rendering accuracy.

Sensors or sensed locations may be inherently offset from a desired position due to the nature of coupling a sensor to a desired location, especially in the case of coupling a sensor or sensed location to a user. Thus, by employing the above described method to offset an actual position to a desired adjusted position and control presentation of a rendered scene based on the adjusted position presentation accuracy of the rendered scene may be improved.

Furthermore, by storing an offset adjusted position to control presentation of a rendered scene in a user profile, motion-based control of a rendered scene may be simplified and time may be saved since repeated calibration of an offset for a sensed object may be reduced or eliminated. Moreover, by updating the profile with a modified adjusted position motion-based control accuracy may be maintained over time even as a user's movement tendencies change.

It will be appreciated that the embodiments and method implementations disclosed herein are exemplary in nature, and that these specific examples are not to be considered in a limiting sense, because numerous variations are possible. The subject matter of the present disclosure includes all novel and nonobvious combinations and subcombinations of the various intake configurations and method implementations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A system for controlling presentation of a rendered scene based on user-controlled movement of a sensed object, comprising:
    one or more sensed locations affixed to the sensed object in a position offset from a desired control position associated with the sensed object;
    a sensing apparatus to sense an actual position of the sensed locations relative to the sensing apparatus; and
    a motion control engine executable on a computing device, in response to the motion control engine receiving position data indicative of the actual position of the sensed locations from the sensing apparatus, the motion control engine being configured to generate an adjusted position based on the position data, wherein the adjusted position is offset from the actual position of the sensed locations to correspond to the desired control position of the sensed object, wherein the adjusted position is fixed relative to the actual position of the sensed locations, and wherein the adjusted position corresponding to the desired control position of the sensed object is used to control a presentation of a rendered scene generated by a computing device on a display positioned away from a user in a fixed location while the user moves relative to the display.

2. The system of claim 1, further comprising:
    a presentation application in communication with the motion control engine, the presentation application being configured to display a rendered scene based on the adjusted position, and configured to change the rendered scene in response to a change in position of the adjusted position.

3. The system of claim 1, wherein the position data of the sensed locations includes six degrees, each degree corresponding to a different axis of movement of the sensed locations, and wherein the adjusted position includes six offset values, each offset value corresponding to a different one of the six degrees and the offset values differing relative to the six different axes of movement.

4. The system of claim 1, wherein the sensed locations include a fixed array of at least three infrared light emitting diodes and the sensing apparatus includes an infrared camera device to detect the respective position of each of the at least three infrared light emitting diodes.

5. The system of claim 1, wherein the sensed object is a head of a user and the sensed locations are secured to the head of the user and the adjusted position is offset from the actual position of the sensed locations to substantially a center position of the head of the user.

6. The system of claim 1, wherein the one or more sensed locations is a plurality of sensed locations, and wherein the motion control engine is configured to offset the adjusted position by a predetermined set of values that differs based on a configuration of the plurality of sensed locations.

7. The system of claim 1, wherein the sensed locations are configured to be selectively coupled with an intermediary object and the motion control engine is configured to offset the adjusted position by a predetermined set of values based on at least one of an orientation of the sensed locations relative to the intermediary object and an orientation of the intermediary object to a user.

8. The system of claim 7, wherein the motion control engine is configured to receive an indication of a type of intermediary object and configured to offset the adjusted position by a predetermined set of values based on the type of intermediary object.

9. A method of controlling a rendered scene presentable on a display of a computing device based on user-controlled movement of an intermediary object, the method comprising:
- receiving positional data from a sensing apparatus, the positional data indicative of an actual position of one or more sensed locations affixed to the intermediary object in a position offset from a desired control position associated with the intermediary object, the actual position relative to a reference position;
- offsetting the actual position of the sensed locations to the desired control position for the intermediary object, where the desired control position is fixed relative to the actual position; and
- generating control commands based on the desired control position, the control commands to control presentation of the rendered scene generated by a computing device on a display positioned away from a user, wherein the control commands adjust the rendered scene responsive to movements of the desired control position, the movements of the desired control position representing movements of the intermediary object.

10. The method of claim 9, wherein the desired control position is user selected.

11. The method of claim 9, wherein the desired control position is defined by a calibration procedure that includes exercising axes of the intermediary object to create a plurality of data points, defining a set of limitations of motion corresponding to each axis of movement of the intermediary object, and iteratively defining offset values of the desired control position based on the data points and the set of motion limitations.

12. The method of claim 9, wherein the desired control position is selectable from a plurality of predefined positions.

13. The method of claim 9, further comprising:
- storing at least one of the desired control position and offset values associated with the desired control position in a profile of a user, wherein the profile is one of a plurality of user profiles.

14. The method of claim 13, further comprising:
- updating the user profile with a modified at least one of the desired control position and offset values associated with the desired control position based on adaptively learned user tendencies.

15. A motion-based control system to control presentation of a rendered scene based on user-controlled movement of a sensed object, the system comprising:
- a motion control engine executable on a computing device, in response to the motion control engine receiving position data from a sensing apparatus indicative of an actual position of one or more sensed locations affixed to the sensed object in a position offset from a desired control position associated with the sensed object, the motion control engine being configured to generate an adjusted position that is offset from the actual position of the sensed locations to correspond to the desired control position and is fixed relative to the actual position of the sensed locations, wherein the adjusted position is adaptively learned as user tendencies change, and wherein presentation of the rendered scene is generated by a computing device on a display positioned away from a user and is based on the adjusted position; and
- a user interface configured to receive user input, wherein the user input defines a characteristic of the adjusted position, and the motion control engine being configured to calibrate the adjusted position based on one or more of the user input and movement tendencies of a user.

16. The system of claim 15, wherein the user input includes a plurality of physical properties that defines a sensed object, and the motion control engine being configured to calibrate the adjusted position based on the plurality of physical properties.

17. The system of claim 15, wherein the user input includes positional data generated from a calibration procedure, wherein the calibration procedure includes exercising the sensed locations in six axes of movement to determine a range of motion of the sensed locations.

18. The system of claim 15, wherein the user input includes selection of the desired control position.

19. The system of claim 15, wherein the user input includes selection of a predetermined offset profile from a plurality of different offset profiles.

20. The system of claim 19, wherein at least one of the plurality of different offset profiles includes at least one sensed location that is positioned relative to a user differently than at least one sensed location of a different predetermined offset profile.

* * * * *